United States Patent
Messing et al.

(10) Patent No.: US 11,131,291 B2
(45) Date of Patent: Sep. 28, 2021

(54) WIND POWER INSTALLATION AND METHOD FOR OPERATING A WIND POWER INSTALLATION

(71) Applicant: Wobben Properties GmbH, Aurich (DE)

(72) Inventors: Ralf Messing, Aurich (DE); Tobias Weber, Aurich (DE)

(73) Assignee: Wobben Properties GmbH, Aurich (DE)

( * ) Notice: Subject to any disclaimer, the term of this patent is extended or adjusted under 35 U.S.C. 154(b) by 83 days.

(21) Appl. No.: 16/465,866

(22) PCT Filed: Dec. 5, 2017

(86) PCT No.: PCT/EP2017/081522
§ 371 (c)(1),
(2) Date: May 31, 2019

(87) PCT Pub. No.: WO2018/104299
PCT Pub. Date: Jun. 14, 2018

(65) Prior Publication Data
US 2019/0301429 A1    Oct. 3, 2019

(30) Foreign Application Priority Data
Dec. 5, 2016 (DE) .............. 10 2016 123 450.8

(51) Int. Cl.
*F03D 7/02* (2006.01)
(52) U.S. Cl.
CPC ...... *F03D 7/0224* (2013.01); *F05B 2270/324* (2013.01); *F05B 2270/325* (2013.01); *Y02E 10/72* (2013.01)

(58) Field of Classification Search
CPC .............. F03D 7/0224; F05B 2270/324; F05B 2270/325
See application file for complete search history.

(56) References Cited

U.S. PATENT DOCUMENTS 7,452,185 B2 * 11/2008 Ide .................. F03D 7/043
                                                   416/35
8,779,611 B2   7/2014 Kabatzke et al.
(Continued)

FOREIGN PATENT DOCUMENTS

CN       103573550 A    2/2014
DE   102010054013 A1    6/2012
(Continued)

*Primary Examiner* — Courtney D Heinle
*Assistant Examiner* — Danielle M. Christensen
(74) *Attorney, Agent, or Firm* — Seed IP Law Group LLP

(57) ABSTRACT

A method for operating a wind power installation for generating electrical power from wind, wherein the wind power installation has an aerodynamic rotor with rotor blades of which the blade angle is adjustable, and the rotor can be operated at a variable rotor rotation speed. Furthermore, the wind power installation has a generator, which is coupled to the aerodynamic rotor, in order to generate an output power. Here, the output power is set depending on the wind in a partial-load mode in which the wind is so weak that the wind power installation cannot yet be operated at its maximum output power, an actual air density of the wind is detected and each blade angle is set depending on the rotor rotation speed and depending on the detected air density. A wind power installation is also provided.

12 Claims, 3 Drawing Sheets

(56) References Cited

U.S. PATENT DOCUMENTS

| | | | |
|---|---|---|---|
| 8,878,378 B2 | 11/2014 | Kabatzke et al. | |
| 9,845,790 B2 | 12/2017 | de Boer et al. | |
| 2012/0139244 A1 | 6/2012 | Bonnet | |
| 2013/0101413 A1* | 4/2013 | Esbensen | F03D 7/0224 |
| | | | 416/1 |
| 2013/0280066 A1 | 10/2013 | Scholte-Wassink et al. | |

FOREIGN PATENT DOCUMENTS

| | | |
|---|---|---|
| EP | 2463518 A2 | 6/2012 |
| EP | 2463520 A2 | 6/2012 |
| EP | 2584193 A1 | 4/2013 |
| RU | 132142 U1 | 9/2013 |
| RU | 2574194 C1 | 2/2016 |
| RU | 2584630 C2 | 5/2016 |

\* cited by examiner

WIND POWER INSTALLATION AND METHOD FOR OPERATING A WIND POWER INSTALLATION

BACKGROUND

Technical Field

The present invention relates to a method for operating a wind power installation and to a wind power installation of this kind.

Description of the Related Art

Wind power installations are known and modern wind power installations generally relate to horizontal-axis wind power installations in which the rotor axis is arranged substantially horizontally and the rotor blades cover a substantially perpendicular rotor area. The present invention also relates to wind power installations of this kind or to this type of wind power installation.

Modern wind power installations of this kind often usually have three rotor blades of which the blade angle can additionally be adjusted. In this case, they can generally be adjusted between a feathered position of approximately 90 degrees up to an optimum angle in the partial-load mode of approximately 0 degrees, or at least only a few degrees below zero. The present invention also relates to a wind power installation with rotor blades of which the blade angle is adjustable.

Adjustment of the rotor blades is usually used for turning the rotor blades out of the wind, specifically increasing the blade angle of said rotor blades, starting from a nominal wind speed as the wind speed continues to increase. Moreover, the present invention is also based on the nomenclature for the blade angle that said blade angle is increased toward the feathered position.

An optimum blade angle is often fixedly set in a partial-load mode in which the wind speed has not yet reached the nominal wind speed. This blade angle, which can also be referred to as the partial load angle, is selected in an aerodynamically optimum manner. To this end, the wind power installation is also operated as far as possible with an optimum tip speed ratio in this partial-load mode. Care should be taken here that this optimum partial load angle is matched to the optimum tip speed ratio, that is to say the ratio of the rotor rotation speed to the wind speed.

Wind power installations are now also increasingly being installed in relatively remote regions which can also differ significantly from customary boundary conditions in terms of climate and installation height. The more the boundary conditions, particularly atmospheric conditions, differ from customary conditions here, the less the assumptions which form the basis for the calculation of the optimum partial load angle and optimum tip speed ratio match the installation site. Accordingly, at least a relatively poor degree of efficiency can be established in the partial-load mode. It can even lead to a partial-load mode as intended not being possible, at least operating in a comparatively unstable manner. In particular, undesired stalls can occur.

A solution to the problem could involve matching each wind power installation to the intended installation site in a correspondingly individual manner. However, this is problematic at least inasmuch as individualized design of this kind can be costly and additionally requires corresponding knowledge of the intended installation site. In addition, care should also be taken in this case that a wind power installation which is individualized in this way can also be moved to the associated installation site. Care should at least be taken that correct parameterization is carried out at the installation site.

Even if these problems were to be handled, problems could nevertheless occur owing to fluctuations relating to the time of year or time of day or other factors for example.

Various methods for controlling wind power installations, which all at least partially exhibit the stated disadvantages, are known from US 2013/0101413 A1, US 2013/0280066 A1, US 2012/0139244 A1 and DE 10 2010 054 013 A1 for example.

US 2013/0101413 A1 discloses a method for controlling the pitch angle of a wind power installation. The wind power installation comprises a rotor with at least one rotor blade. The method comprises setting the angle of attack of the at least one rotor blade as a function of the determined air density.

US 2013/0280066 A1 comprises a method for operating a wind power installation comprising operating the wind power installation in a noise reduction mode based on at least one setpoint value of a wind power installation parameter in such a way that the noise generated by the wind turbine remains below a predefined noise emission level. Provision is made for a correction factor to be applied to the at least one setpoint value of a wind power installation parameter. The correction factor is determined depending on an air density-related value.

US 2012/0139244 A1 discloses a method for controlling at least one wind power installation comprising selecting a first effective operating curve from amongst a plurality of operating curves and using the first effective operating curve for controlling at least one wind power installation. The operating curves can be made up of operating curve segments.

DE 10 2010 054 013 A1 finally discloses a method for operating a pitch-controlled wind power installation with at least one rotor blade, of which the longitudinal axis can be adjusted, and a generator, in which wind power installation a setpoint value for the generator torque is prespecified depending on a rotation speed of the generator or of the rotor, wherein a transition point is provided at which a changeover is made from a partial-load mode to a full-load mode, said method comprising the steps of ascertaining a value for a the air density ρ, setting a preliminary pitch angle $\varphi_{pre}$ starting from a preliminary pitch rotation speed which is lower than the rotation speed at the transition point, wherein the value of the preliminary pitch angle $\varphi_{pre}$ is dependent on the ascertained value of the air density ρ in such a way that a larger preliminary pitch angle is set at a relatively low air density than at a relatively large air density.

BRIEF SUMMARY

Provided is a method which takes into account the individual atmospheric conditions or at least does so better than before. Provided is a method for operating a wind power installation with an aerodynamic rotor which has a plurality of rotor blades of which the blade angle can be adjusted. A rotor with only one rotor blade can also be used in principle, but an aerodynamic rotor with three rotor blades is preferably proposed. The rotor can also be operated at a variable rotor rotation speed. The rotor rotation speed can therefore be changed, for example, depending on the wind speed, particularly in the partial-load mode.

The aerodynamic rotor is coupled to a generator which generates an output power. Disregarding the power loss, the generator therefore generates the power drawn from the wind.

The output power is set depending on the wind, that is to say depending on the wind speed, in a partial-load mode in which the wind is so weak that the wind power installation cannot yet be operated at its maximum output power. The partial-load mode is therefore the mode in which the wind power installation cannot yet reach its maximum output power on account of excessively weak wind, specifically in which it can in particular not yet reach its rated power. The rated power can usually be achieved when the wind speed has reached the nominal wind speed. Accordingly, the partial-load mode also relates to a mode of the wind power installation up to the nominal wind speed.

It is now proposed that the current air density of the wind, that is to say the current air density of the atmosphere surrounding the wind power installation, is detected.

It is then proposed that each blade angle is set depending on the output power or the rotor rotation speed and depending on the detected air density.

Accordingly, it is proposed that the blade angle of each rotor blade is set in the partial-load mode. This can also mean that said blade angles can be set at the same values synchronously to one another. Therefore, however, a constant blade angle is not provided over the entire range of the partial-load mode, but rather said blade angle is changed. This change is made depending on the output power or the rotor rotation speed. The output power or the rotor rotation speed therefore forms an input variable for this process of setting the blade angle. It should be taken into consideration for this purpose that the output power or the rotor rotation speed is directly detected and used for this process of setting the blade angle, or that a value which is equivalent to the output power or to the rotor rotation speed is used, for example a value which is proportional to the output power or rotor rotation speed and ranges from zero to one due to a standardization.

In addition, the detected air density is taken into account as a factor on which the process of setting the blade angle is dependent. The blade angle therefore also depends directly on the air density. Therefore, an air density which changes during operation can also be taken into account and this takes place by means of corresponding setting of the blade angle here.

Therefore, a solution is proposed which allows different air density values to be taken into account. Therefore, it is possible to match the operation of a wind power installation to locations with average air density values which significantly differ from customary air density values. However, it is also possible to take into account fluctuating air density values. Therefore, good operation of a wind power installation can also be realized at sites which are subject to severe fluctuations in air density.

In this case, it has been found that particularly low air density values lead to an effective angle of attack on the rotor blade increasing. Owing to the air density-dependent adjustment of the blade angles, referred to as pitching by a person skilled in the art, this effective angle of attack which is increased in this way can be compensated again.

In this case, the angle of attack is the angle between the rotor blade and the apparent wind, that is to say the angle between the rotor blade and the direction of the actually incoming air flow during operation, that is to say taking into account the movement of the rotor blade. The angle of attack can also be referred to as the effective angle of attack.

For the purpose of detecting the air density, an air pressure and an air temperature outside the wind power installation, but in the vicinity of the wind power installation, are preferably measured and the air density is determined therefrom, in particular is calculated therefrom. Therefore, the air pressure is detected directly by current measurements and as a result changes in the air density can also be immediately identified and it is possible to react thereto if necessary.

According to one embodiment, it is proposed that the blade angle is set depending on a pitch characteristic. This pitch characteristic specifies, for the partial-load mode, the blade angle to be set as a function of the output power or of the rotor rotation speed. To this end, it is proposed that the pitch characteristic also depends on the air density. Therefore, the process of setting the blade angle can be performed in a simple manner by means of a pitch characteristic. Setting depending on the output power can be easily implemented because the output power is often available as a control-related variable in a process computer which is used. If the rotor rotation speed is used as an input variable, it can be measured and can likewise be available as such in a process computer which is used. In addition, the output power and the rotor rotation speed are often in a fixed ratio.

Care should also be taken that the dynamics of the power control arrangement are much more rapid than the dynamics of the pitch control arrangement, so that any vibration problems between the power control arrangement on the one hand and the pitch control arrangement on the other hand can also be avoided in this way.

It is preferably proposed that a plurality of pitch characteristics are stored and that one pitch characteristic is selected from amongst the stored pitch characteristics depending on the detected air density, said pitch characteristic matching the corresponding air density or having been stored for the corresponding air density. This pitch characteristic is then used for setting the blade angle. As a result, the air density can be taken into account by means of the pitch characteristic in a simple manner by way of, specifically, the pitch characteristic as such specifying only one relationship between blade angle and rotor rotation speed, but the dependence on air density being incorporated by way of a plurality of pitch characteristics, that is to say in particular a set of pitch characteristics, being stored and the pitch characteristic which matches the respective air density being selected.

It is preferably proposed that the blade angle is increased as the air density decreases. As a result, it is possible, in particular, to counteract an effective angle of attack which increases due to the decreasing air density. It has been found that by increasing the blade angle as the air density decreases it is possible to prevent the effective angle of attack increasing and therefore a stall is avoided.

As a result, a stall can occur particularly at comparatively low air densities, this now being avoided.

According to one embodiment, it is proposed that the method is characterized in that the output power is dynamically set with a first time constant and the rotor blade angle is dynamically set with a second time constant. To this end, it is proposed that the first time constant is selected to be smaller than the second time constant, preferably at least by a factor of 10. It is therefore proposed that the output power is set with higher dynamics. In particular, a delay element of the first order or a delay element of the second order can be applied here as dynamics and to this end the time constants are determined in accordance with generally customary definition. In this case, the time constant for the delay element of the first order can be considered to be the time at which the step response of the delay element assumes the value 0.63, based on an input step with the amplitude 1.

Therefore, it is possible for the priority control in the partial-load mode to be carried out by setting the output power. This can be limited substantially to a response of the control arrangement for the output power particularly in the case of small fluctuations in the wind speed and therefore small fluctuations in the rotor rotation speed. Blade adjustments are then preferably carried out less frequently or at least with a comparatively low amplitude.

According to a further embodiment, it is proposed that, in the partial-load mode, the output power is set by means of an operating characteristic. This operating characteristic specifies the output power to be set depending on the rotor rotation speed. An operating characteristic of this kind can therefore be stored just like the abovementioned pitch characteristic or the abovementioned pitch characteristics.

To this end, it is now additionally proposed that the output power additionally depends on the detected air density. This can be realized, in particular, such that, for the purpose of taking into account different air densities, a plurality of operating characteristics are stored and these are selected depending on the air density. In this respect, a set of operating characteristics can also be stored here, wherein an operating characteristic is associated with in each case one air density and the correspondingly associated operating characteristic is selected depending on the detected air density.

The use of an operating characteristic for setting the output power is also preferably proposed when the operating characteristic does not depend directly on the air density, that is to say when the air density is taken into account only or particularly by means of setting the blade angle.

Provided is a wind power installation for generating electrical power from wind and a wind power installation of this kind comprises an aerodynamic rotor with rotor blades of which the blade angle can be adjusted, wherein the rotor can be operated at a variable rotor rotation speed. The wind power installation also has a generator which is coupled to the aerodynamic rotor and with which an output power is generated. These wind power installations are equipped to be operated in a partial-load mode which is defined as above. In this case, said wind power installation is equipped to detect a current air density of the wind and to set each blade angle depending on the rotor rotation speed or the output power and also depending on the detected air density.

Therefore, the output power is set depending on the wind in the partial-load mode here too. In this case, this is not necessarily done directly depending on the wind, that is to say not necessarily depending on a wind measurement, but rather preferably by setting the output power depending on the rotor rotation speed. A stable operating point is preferably found here, at which the set output power is set such that the rotor rotation speed does not change provided that the wind speed does not change either. As a result, the output power is then ultimately set at the wind speed prevailing at that instant.

The wind power installation can be equipped to set the blade angle depending on the rotor rotation speed or the output power and depending on the detected air density particularly by way of a process computer or, overall, the process management or process control technology provided in the wind power installation being able in general to detect an air density. To this end, a sensor for measuring the air pressure and also a sensor for measuring the air temperature can be provided for example. As an alternative, corresponding data inputs come into consideration. Furthermore, a corresponding data memory can be provided, in which corresponding desired relationships between blade angle and air density are stored discretely or as functions. Provision can particularly be made to provide a data memory which stores a set of pitch characteristics.

A power control means which is equipped for setting the output power depending on the rotor rotation speed is preferably provided. Particularly for an externally excited synchronous generator, the control means can set the external excitation. To this end, for example, a corresponding current controller can be provided for controlling an excitation current, which current controller can be controlled depending on the rotor rotation speed in particular.

Furthermore, a pitch control means which is equipped for setting a blade angle depending on the rotor rotation speed and the air density is provided. This pitch control means can therefore comprise, for example, a pitch drive for each rotor blade and a control processor can also be provided for this purpose, said control processor controlling the pitching depending on the rotor rotation speed and the air density, the pitch drive then implementing said pitching. Some of the process of calculating the blade angle to be respectively set can also be performed centrally for all rotor blades and therefore all pitch drives.

A storage means which is equipped for storing blade angle settings depending on the rotor rotation speed and the air density is also proposed. Provision is particularly made here for this storage means to store air density-dependent pitch characteristics.

The wind power installation is preferably equipped to execute at least one method according to one of the above-described embodiments. In particular, a method of said kind can be implemented on a control apparatus in the wind power installation.

The invention will now be explained in more detail by way of example below using exemplary embodiments with reference to the accompanying figures.

DETAILED DESCRIPTION

Figure 1:
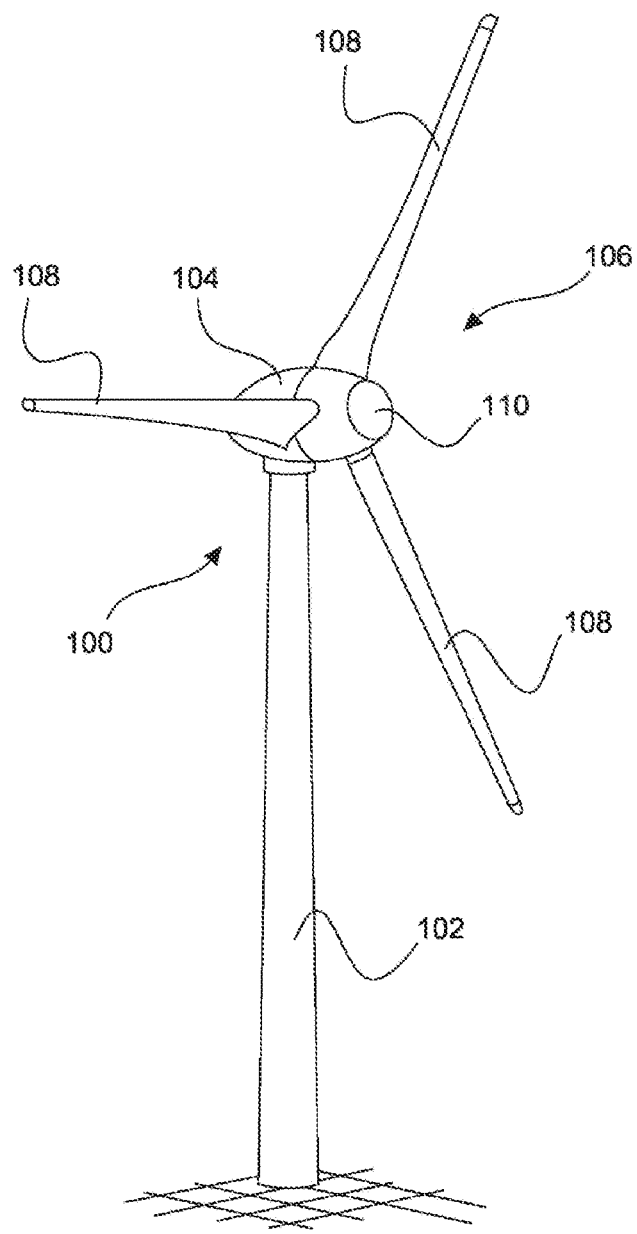
FIG. 1 schematically shows a perspective illustration of a wind power installation.

FIG. 1 shows a schematic illustration of a wind power installation according to the invention. The wind power installation 100 has a tower 102 and a nacelle 104 on the tower 102. An aerodynamic rotor 106 with three rotor blades 108 and a spinner 110 is provided on the nacelle 104. During operation of the wind power installation, the aerodynamic rotor 106 is made to rotate by the wind, and therefore an electrodynamic rotor of a generator, which is directly or indirectly coupled to the aerodynamic rotor 106, also rotates. The electric generator is arranged in the nacelle 104 and generates electrical energy. The pitch angle of the rotor blades 108 can be changed by pitch motors at the rotor blade roots 108b of the respective rotor blades 108.

Figure 2:
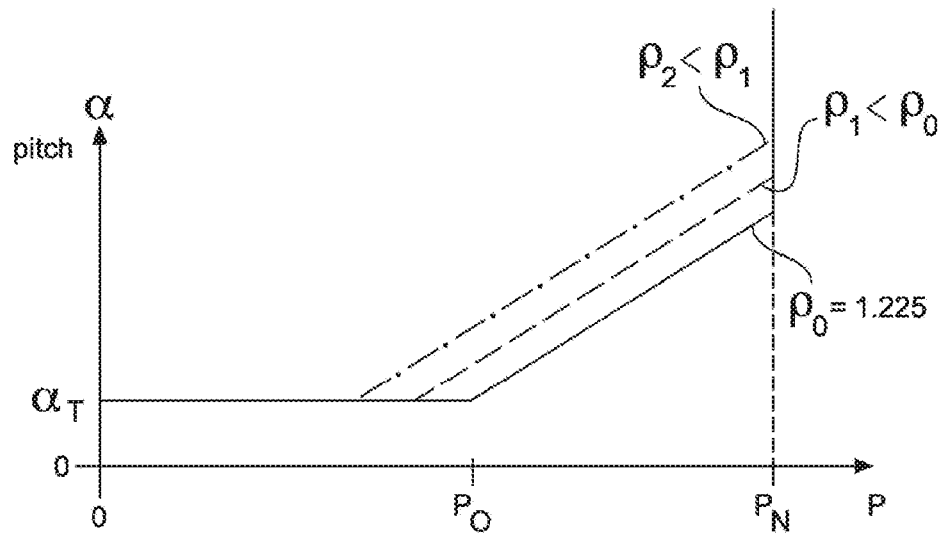
FIGS. 2 and 3 each show a set of pitch characteristics.
Figure 3:
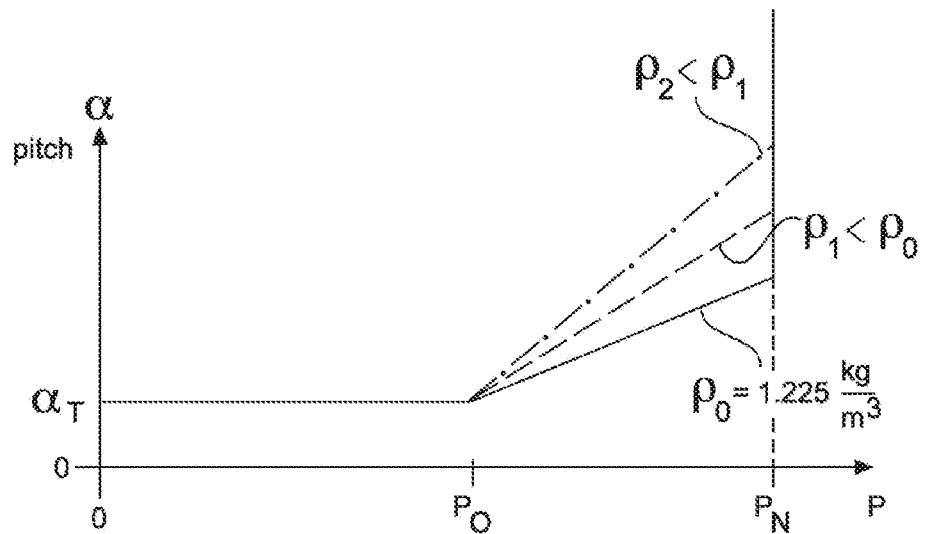

FIGS. 2 and 3 show, in principle, two different types of sets of characteristics. Both FIGS. 2 and 3 show the blade angle α, which can also be referred to as pitch or pitch angle, depending on the output power P. In both cases, there is initially a constant blade angle α, which can have the value of a fixedly prespecified partial load angle $α_T$, at low powers. As the power P increases, it is proposed to then increase the blade angle α. In this case, different characteristics are provided for the blade angle depending on the air density ρ, said different characteristics therefore forming a set of characteristics. The two exemplary proposals of FIGS. 2 and 3 differ in respect of the set of characteristics.

FIG. 2 shows a profile in which the blade angle is increased at all the more smaller powers P, the lower the air density ρ. In this case, the solid curve shows the profile of the blade angle for a normal air density $ρ_0$, for which a value of 1.225 kg/m³ is taken as a basis. For this normal air density, the blade angle increases starting from a power $P_0$. The dotted characteristic shows a profile for a lower air density $ρ_1$ and the dashed-and-dotted characteristic shows a profile for an even lower air density $ρ_2$. According to these two characteristics, the blade angle is already increased for a lower output power than $P_0$. The value of $ρ_2$ can be 1 kg/m³ and that of $ρ_1$ can be 1.1 kg/m³ for example.

It can be seen that the characteristics of FIG. 2 have been selected such that they run approximately parallel to one another.

In the embodiment of FIG. 3, it is proposed to also increase the blade angles for different air densities $ρ_0$, $ρ_1$ and $ρ_2$ starting from a power $P_0$. However, a profile which is all the more steeper the lower the air density is then proposed.

The values for P0, $ρ_0$, $ρ_1$ and $ρ_2$ can be the same for both FIGS. 2 and 3. The two FIGS. 2 and 3 also show a profile of the blade angle characteristics and therefore of the sets of characteristics up to the rated power $P_N$.

Figure 4:
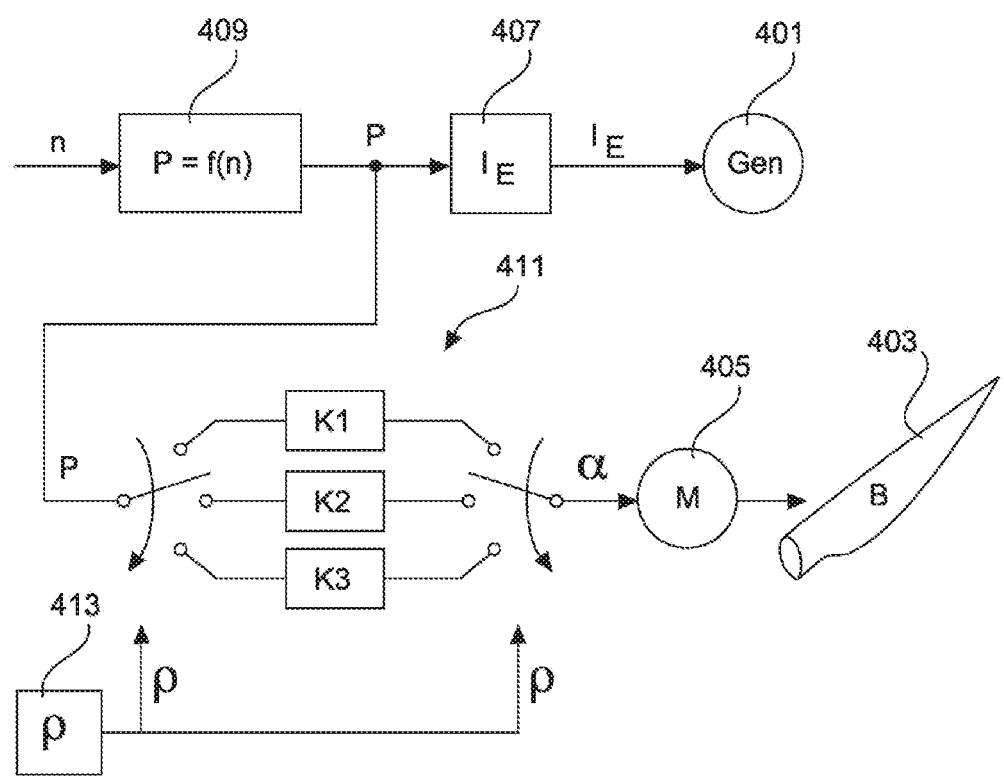
FIG. 4 shows a simplified control structure for carrying out setting of a blade angle in the partial-load mode depending on the output power and the detected air density.

The control structure or controller of FIG. 4 shows, in an illustrative manner, a generator 401 and a rotor blade 403 which can be adjusted by means of a pitch drive 405. These elements are only symbolically illustrated and it is possible for, for example, three rotor blades 403 which each have a pitch drive 405 and are driven by the wind and as a result drive the generator 401 to be provided.

The generator 401 is provided as an externally excited synchronous generator here and, in this structure, is driven by means of a current controller 407 which controls the excitation current $I_E$. As a result, power control is performed, this being only simply indicated here and it being possible for this to also be performed differently. Other generators can also be provided. The current controller 407 also represents other power control arrangements here. Said current controller receives a power value P as a prespecification and this power value P is given by a rotation speed/power characteristic which is stored in the characteristic block 409 of the controller. The characteristic block 409 outputs a power value P based on the rotation speed/power characteristic depending on the rotation speed n of the rotor to which the rotor blades 403 belong.

The power value P is not only input into the current controller in order to control the power of the generator 401 by means of the power controller 407, but rather the power value P is also used as an input variable for a blade angle prespecification unit 411. The blade prespecification unit 411 determines a blade angle α to be set depending on the power P. In this case, the output power of the wind power installation, that is to say the power actually output by the wind power installation, is preferably used as the input variable. However, for the sake of simplicity and for illustration purposes, the output power can be equated to the power P which the characteristic block 409 outputs. The output power is set with high dynamics, so that this simplification for illustration is permissible and so that there are no vibration problems or hazards between the power setting on the one hand and the blade angle adjustment on the other hand.

The blade angle prespecification unit 411 of the controller has a plurality of characteristic blocks, of which three characteristic blocks K1, K2 and K3 are shown here by way of example. Each of these characteristic blocks has a power-dependent blade angle characteristic, which blade angle characteristics together form a set of characteristics and, respectively, provide a set of characteristics for selection. It is now proposed to select one of the characteristic blocks and therefore one of the characteristics depending on the air density ρ. For this purpose, the air density r can be detected, for example, by a measurement unit 413.

The blade angle α can therefore be set depending on the output power P and the air density ρ. For this purpose, the output power P forms the input variable for the blade prespecification unit 411 and the air density ρ is input by way of a matched characteristic being selected depending on the air density ρ. The blade angle α ascertained in this way is then passed to the pitch drive 405 in order to correspondingly set the respective rotor blade 403.

Therefore, a solution has been proposed in order to improve the prior art in which rotor blades are designed such that air can flow around them at a normal air density of ρ=1.225 kg/m³ at all operating points of the installation without separation. It has been found that installations are now increasingly being planned at locations at which the air density is, sometimes considerably, below the standard air density. This leads to flow separations possibly occurring due to the increase in the effective angle of attack on the rotor blade, this in turn possibly leading to substantial power losses. In this case, it has been found that the smaller the air density becomes, the more the effective angles of attack on the rotor blade increase and the more likely it is that power-reducing flow separations will occur. The flow separations can be avoided by pitching of the rotor blades. It is proposed here that pitching of the rotor blades is matched to the air density. Accordingly, it is proposed that the pitch angle to be set is now a function of the electrical output power, specifically the output power, and the air density. It is therefore proposed that not only a function of the electrical output power forms the basis for setting of the blade angle. It is therefore proposed to measure the air pressure and the temperature at the wind power installation and to calculate the air density therefrom, so that the respective pitch angle can be determined with the aid of a stored function.

Ultimately, the increase in the annual yields of a pitch-controlled, variable-speed wind power installation can therefore also be achieved by the proposed use of pitch characteristics which are matched to the air density of the location.

The invention claimed is:

1. A method for operating a wind power installation for generating electrical power from wind, wherein:
   the wind power installation has an aerodynamic rotor with a plurality of rotor blades, wherein blade angles of the plurality of rotor blades are adjustable, wherein the aerodynamic rotor is configured to be operated at a variable rotor rotation speed, and
   the wind power installation has a generator that is coupled to the aerodynamic rotor and is configured to generate an output power, the method comprising:
      setting the output power depending on wind in a partial-load mode in which the wind is so weak that the wind power installation cannot be operated at its maximum output power;
      determining an air density of the wind; and setting each blade angle of the plurality of rotor blades depending on the output power or the rotor rotation speed and depending on the air density, wherein the output power is dynamically set with a first time constant, wherein each blade angle of the plurality of rotor blades is dynamically set with a second time constant, and wherein the first time constant is selected to be smaller than the second time constant.

2. The method as claimed in claim 1, wherein determining the air density comprises measuring an air pressure and an air temperature outside of the wind power installation and calculating the air density from the air pressure and the air temperature.

3. The method as claimed in claim 1, wherein setting each blade angle comprises setting each blade angle depending on a pitch characteristic, wherein the pitch characteristic specifies, for the partial-load mode, the blade angle to be set as a function of the output power or the rotor rotation speed, wherein the pitch characteristic depends on the air density.

4. The method as claimed in claim 1, comprising storing a plurality of pitch characteristics, wherein one pitch characteristic is selected from amongst the stored pitch characteristics depending on the air density to be used for setting the blade angle.

5. The method as claimed in claim 1, wherein each blade angle of the plurality of rotor blades is increased as the air density decreases.

6. The method as claimed in claim 1, wherein in the partial-load mode, the output power is set by an operating characteristic which specifies the output power to be set depending on the rotor rotation speed, and wherein the output power depends on the air density.

7. The method as claimed in claim 6, wherein the output power depends on the air density such that for the purpose of taking into account different air densities, a plurality of operating characteristics are stored and one of the plurality of stored operating characteristics is selected depending on the air density.

8. A wind power installation comprising one or more controllers configured to execute the method as claimed in claim 1.

9. The method as claimed in claim 1, wherein the first and the second time constants are respectively the time constant of a delay element of a first order or a delay element of a second order.

10. A wind power installation for generating electrical power from wind, comprising:
  an aerodynamic rotor, wherein the aerodynamic rotor is configured to be operated at a variable rotor rotation speed;
  a plurality of rotor blades coupled to the aerodynamic rotor, wherein blade angles of the plurality of rotor blades are adjustable;
  a generator coupled to the aerodynamic rotor, wherein the generator is configured to generate an output power, wherein the generator is configured to generate the output power depending on wind in a partial-load mode in which the wind is so weak that the wind power installation cannot be operated at its maximum output power; and
  a controller configured to:
    determine air density of the wind based on one or more sensed qualities of air outside of the wind power installation, and
    set each blade angle depending on the output power or the rotor rotation speed and depending on the air density,
    wherein the output power is dynamically set with a first time constant, wherein each blade angle of the plurality of rotor blades is dynamically set with a second time constant, and wherein the first time constant is selected to be smaller than the second time constant.

11. The wind power installation as claimed in claim 10, comprising:
  a power controller configured to set the output power depending on the rotor rotation speed,
  a pitch controller configured to set a blade angle depending on the rotor rotation speed and the air density, and
  data memory configured to store blade angle settings depending on the rotor rotation speed and the air density.

12. The wind power installation as claimed in claim 11, wherein the data memory is configured to store air density-dependent pitch characteristics.

* * * * *